United States Patent Office.

OSCAR BALLY, OF LUDWIGSHAFEN, GERMANY, ASSIGNOR TO THE BADISCHE ANILIN AND SODA FABRIK, OF SAME PLACE.

DYE FROM ANTHRACENE-BLUE.

SPECIFICATION forming part of Letters Patent No. 654,506, dated July 24, 1900.

Application filed January 9, 1900. Serial No. 880. (No specimens.)

*To all whom it may concern:*

Be it known that I, OSCAR BALLY, doctor of philosophy, a citizen of the Swiss Republic, residing at Ludwigshafen-on-the-Rhine, in the Kingdom of Bavaria, Germany, have invented new and useful Improvements in Mordant-Dyeing Coloring-Matters Fast to Milling, of which the following is a specification.

My present invention relates to the production of new mordant-dyeing coloring-matters which are especially characterized by their complete fastness to milling. The initial materials that I use are the more greenish brands of the coloring-matters known in commerce as "anthracene-blue," and also the similar coloring-matters known in part by other names. The said coloring-matters result, for instance, from the treament of dinitro-anthraquinones with fuming sulfuric acid and sulfur, with or without the addition of boracic acid. According to my present invention I treat these products with a fixed alkali—for instance, caustic soda—and this treatment is effected at a high temperature with or without the application of pressure.

The following examples will serve to further illustrate the nature of the invention and the manner in which it is best carried into practical effect. The parts are by weight.

Example 1: Mix together one hundred (100) parts of the coloring-matter paste known in commerce as "anthracene-blue G," equal to ten (10) parts dry coloring-matter, and thirty-eight (38) parts of caustic-soda lye, (containing about twenty-four per cent. real NaOH.) Heat the mixture in an autoclave for about seven hours at a temperature of about 160° to 165° centigrade. Pour the melt into water, boil up, and precipitate the coloring-matter with an acid, and filter.

Example 2: Mix together about one hundred (100) parts of the coloring-matter paste known in commerce as "anthracene-blue G," containing about ten (10) parts dry coloring-matter and fifty (50) parts of solid caustic soda. Heat the mixture so that it boils for about three hours. The melt thus obtained can be worked up in the manner described in the foregoing example and a similar product obtained.

Example 3: Mix together about one hundred (100) parts of a ten-per-cent. paste of the coloring-matter that can be obtained according to the example of the Letters Patent No. 617,686 and about forty (40) parts of caustic-soda lye, (containing about twenty-four per cent. real NaOH.) Heat the mixture in an autoclave for about ten hours at a temperature of about 120° centigrade. Work up the melt as described in Example 1.

My new coloring-matter in the dry state constitutes a dark-colored powder possessing a metallic luster. It is almost insoluble even in boiling water. In sodium acetate it dissolves, giving a red-violet to violet solution. In sodium carbonate the solution is violet blue, and in caustic soda the solution is blue, while in concentrated sulfuric acid a Bordeaux-red to violet solution is obtained.

The new coloring-matter dyes chrome-mordanted wool, giving blue shades which are very fast to milling and which are redder than those given by the initial material used.

Now what I claim is—

1. The process for the manufacture of new mordant-dyeing coloring-matter fast to milling by treating anthracene-blue coloring-matters with a caustic alkali at a high temperature.

2. As a new article of manufacture the new blue mordant-dyeing coloring-matter which can be obtained by treating a greenish anthracene-blue dye with a caustic alkali at a high temperature and which yields blue shades on chrome-mordanted wool which are very fast to milling and which gives a Bordeaux-red to violet solution in concentrated sulfuric acid, all substantially as described.

In testimony whereof I have hereunto set my hand in the presence of two subscribing witnesses.

OSCAR BALLY.

Witnesses:
ERNEST E. EHRHARDT,
PAUL JULIUS.